Feb. 3, 1948. T. GROFF 2,435,348
HARDNESS AND THICKNESS GAUGE
Filed June 22, 1944

Inventor
TORJUS GROFF
By Carlsen & Hayle
Attorneys

Patented Feb. 3, 1948

2,435,348

UNITED STATES PATENT OFFICE 2,435,348

HARDNESS AND THICKNESS GAUGE

Torjus Groff, Brinsmade, N. Dak.

Application June 22, 1944, Serial No. 541,566

5 Claims. (Cl. 73—81)

This invention relates generally to improvements in machines or devices for gauging the hardness and thickness of metals and the like.

It is customary in the fabrication of many structural parts, formed from sheet material, to gauge or measure the hardness of the material. Thus it may be that the parts are formed prior to heat treatment or hardening of the material, after which the parts are treated and tested to determine the hardness and uniformity of this quality in order to maintain a desired standard. The specifications also usually set a maximum tolerance for thickness of the material to maintain uniformity of strength. It is the present best practice, to my knowledge, to make the hardness tests in a machine, known by the tradename Rockwell, which measures the penetration of a moving part into the surface of the material, under a known pressure. To check the material for thickness or gauge it is then, by a separate operation, measured occasionally or spot checked by the conventional micrometer. Obviously the two operations require some time, while the only occasional spot checking of the thickness does not assure complete maintenance of allowable tolerances.

It is the primary object of my invention to provide means whereby the thickness may be checked simultaneously as the hardness is gauged, and any departure beyond the maximum degree of tolerance as to thickness instantly detected, thus effecting a saving in time while achieving greater uniformity and accuracy. A further object is to provide means of this nature which may be readily attached to the conventional hardness gauge to operate without in any way interfering with normal use of which gauge, and which attachment is extremely simple in construction and convenient in operation.

These and other more detailed and specific objects will be disclosed in the course of the following specification, reference being had to the accompanying drawing, in which—

Figure 1:
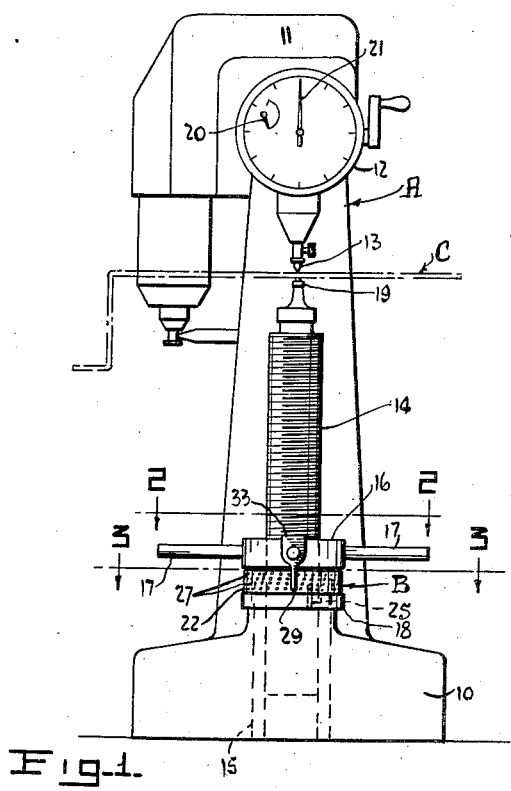
Fig. 1 is a frontal elevation of the Rockwell type of hardness gauge equipped with means for thickness measuring in accordance with my invention.
Figure 2:
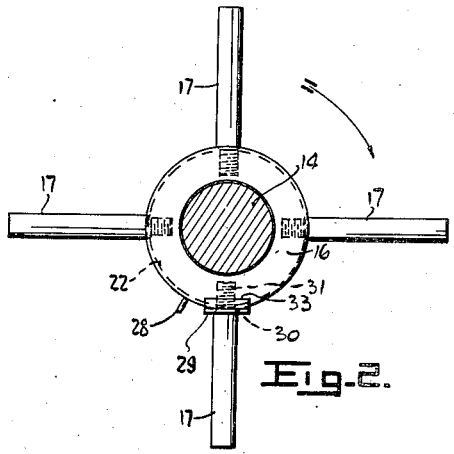
Fig. 2 is an enlarged horizontal sectional view along the line 2—2 in Fig. 1.

Referring now more particularly and by reference characters to the drawing, A designates generally a hardness testing machine of the Rockwell type and B the thickness gauging means of my invention. The machine A comprises a base 10 over which is supported a head 11 carrying a dial 12 and a depending, vertically moving and spring depressed or spring loaded penetrator 13. A capstan screw 14 is vertically movable in a sleeve or guide 15 in the base 10 and may be adjusted by a capstan nut 16 having radially extending arms or spokes 17. The nut 16 rests upon the upper end of the sleeve 15 in spaced relation above a clamping ring 18 and by turning the nut in one direction, or clockwise as viewed in Fig. 2, it is obvious that the screw 14 may be raised while reverse movement will allow the screw to descend of its own weight. The screw 14 carries an anvil 19 at its upper end which is vertically aligned with the penetrator 13.

This machine is conventional in construction, and in operation the stock or part, designated at C, to be tested is placed between the anvil 19 and penetrator 13 and the anvil raised by turning the capstan nut 16 and raising the screw 14. As this action continues the material comes in contact with the penetrator 13 which is in turn forced upward against its spring load until a known amount of pressure, commonly called the minor load, is applied to the material. This minor load is determined by observation of a small pointer 20 on the dial 12. As the minor load, or pressure, reaches the known reference value the operator ceases turning the capstan nut 16 and applies the major load which comprises a weight or weights on a weight arm and which forces the penetrator 13 into the material with a known pressure. As the major load is removed the penetration is read by the main pointer 21 of dial 12 indicating the relative hardness of the material. Since the parts forming the minor and major loads are entirely conventional and not important to the complete disclosure of my invention they are not illustrated herein.

To release the tested part or stock the capstan screw 14 is, of course, lowered and the machine made ready for the next operation.

It will be observed that the upward movement of the capstan screw 14 by a clockwise movement of the capstan nut 16 is a vital part of the operation of applying the minor load in the hardness testing procedure and that for a given gauge or thickness of the material being tested the nut 16 will each time be moved to the same point. Thus any deviation of the thickness of the material being tested for hardness will result in the capstan nut 16 coming to a rest, with the optimum minor load applied, in a position different from that obtaining when the gauge is constant.

In the conventional machine with which I am familiar a complete turn of the capstan nut 16 through 360 degrees moves the screw 14 and anvil 19 through a distance of .200 inch. Thus each increment of rotation of the nut 16, corresponding to 1/200 of a complete revolution will result in an axial movement of the screw 14 of .001 inch.

Bearing the foregoing in mind I provide in my thickness checking means B a fixed reference member in the form of a collar or ring 22 which is apertured at 23 to fit downwardly over the upper end portion of the sleeve 15 and rest against the clamping ring 18. The collar 22 thus surrounds the screw 14 below the capstan nut 16 and is of such thickness as to clear the underside of the nut as seen at 24. The collar 22 is locked against rotation with respect to the nut 16 by a dowel or pilot pin 25 which projects upwardly from the clamping ring 18 into a socket 26 in the underside of the collar. The collar may obviously be readily installed by lifting out the capstan screw 14 to expose the upper end of the sleeve 15, and may be as readily removed when desired.

Around the peripheral surface of the collar 22 I provide a series of evenly radially spaced and outwardly opening recesses or sockets designated generally at 27 and each spaced from the next by a peripheral distance equal to 1/200 of the circumference of the collar. As here shown these recesses are laid out in four superimposed rows to better accommodate their number to the space available but the specific arrangement is, of course, immaterial. A pin 28 is provided for insertion into any one of the recesses 27 from which it will then project radially from the surface of the collar as clearly shown.

Figure 3:
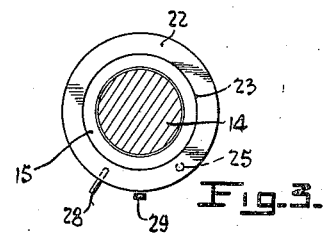
Fig. 3 is a similar view along the line 3—3 in Fig. 1.

The capstan nut 16 is then provided with an index or stop finger 29 which depends from the nut in position to clear and travel around the peripheral surface of the collar 22 as the nut rotates. The index 29 may be conveniently mounted by the provision of an opening 30 in its upper end portion to pass the reduced and threaded end 31 of any one of the arms 17 of the capstan nut. The selected arm is removed from its socket 32 in the nut 16, the index put in place and the arm turned up to secure the index as clearly shown. To prevent any rocking displacement of the index 29 its upper end is provided with a lip 33 turned inwardly over the upper edge of the capstan nut. The index 29 travels in such proximity to the collar 22 that the pin 28 lies in its path as clearly indicated in Fig. 3.

In operation, the pin 28 is first removed and the hardness testing of a part or stock C of known desired thickness, checked by a micrometer for example, proceeds exactly as previously described. As the minor load is applied, however, the position of the index 29 is noted and the pin 28 is now inserted into one of the recesses 27. Thus, assuming that the permissible minus thickness tolerance of the parts or stock being tested is .006 inch, the pin 28 will be put in place by counting off six of the recesses 27 clockwise around the collar 22 from the index 29 and inserted into the sixth such recess. Now as the next part is tested and the capstan nut 16 turned to apply the minor load the position of the index 29 with reference to the pin 28 thus placed will indicate the thickness of the part relative to standard or desired gauge. For example if the index 29 contacts the pin 28 before minor load is fully applied it will immediately apprize the operator of the fact that the part is below gauge by an amount greater than .006 inch, the permissible tolerance, so that the part may be discarded. If the minor load may be fully applied before the capstan nut movement is halted by engagement of the index 29 with the pin 28 the operator will know that the thickness of the material is within tolerance range. No attention on the operator's part is required once the pin 28 has been set up and the only time at which the normal orderly process of hardness testing will be halted is when a part of improper thickness appears.

It will be evident that the number and distance between the recesses 27 will be determined by the pitch of the threads of the capstan nut and screw and the fractional part of a selected integer in which it is desired to measure.

Figure 5:
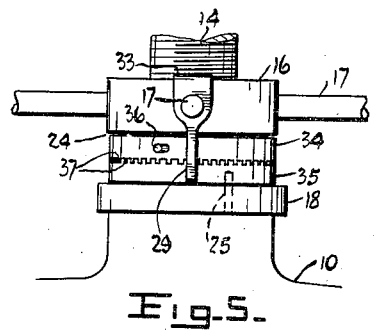
Fig. 5 is a similar view but showing a modification of the thickness gauge.
Figure 4:
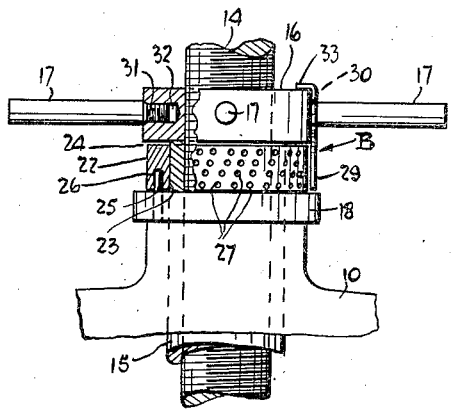
Fig. 4 is a fragmentary elevation and section through my thickness gauging means and associated parts of the hardness gauge.
Figure 6:
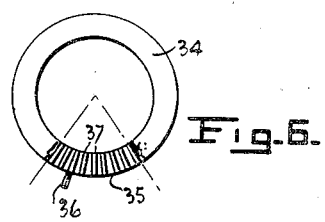
Fig. 6 is a plan view of one part of the gauge as seen in Fig. 5.

Referring now to Figs. 5 and 6 I show therein a modification of my invention wherein the collar is made of two superimposed parts 34 and 35. The lower part is locked against rotation by the dowel pin 25 while the upper part carries a pin 36 which is secured in place and corresponds in function to the removable pin 28 previously described. The meeting faces of the upper and lower collar parts 34 and 35 are provided with mating, radially extending grooves and ribs or serrations designated collectively at 37 and when these are engaged it will be obvious that the upper part 34 of the collar will be locked against rotation. By lifting the capstan nut 16 the upper part 34 of the collar may be lifted to disengage the serrations and then turned about to position the pin 36 with respect to the index 29, after which when the serrations are reengaged, the pin will be held in such selected position. The depth of the serrations is such that upward movement of the upper part of the collar into contact with the underside of the capstan nut 16, taking up the space 24 will not release said upper collar part to disturb the adjustment.

The width of the grooves and ribs making up the serrations 37 is selected in accordance with the same factors as was the spacing between the recesses 27 in the one part collar 22 and thus the pin 36 may be positioned at known distances from the normal position assumed by the index 29 as minor load is applied in accordance with the permissible thickness tolerance. The operation is then exactly the same as that described hereinbefore.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. In a machine for testing the hardness of a material and including a penetrator and a screw and a nut arranged to urge said screw endwise to place the material under pressure against the penetrator during the hardness testing operation, means for simultaneously gauging the thickness of the material comprising a collar fixed around the screw, an index carried by the nut to travel around the collar as the screw is moved endwise, said collar having spaced openings in its circumference the spacing of which represents fractions of a complete revolution of the nut and of a resulting range of movement of the screw, and a pin adapted to be inserted in any selected opening in the collar to lie in the path of the index and limit movement of the nut with respect thereto.

2. In a device for measuring the thickness of material and including a screw, a nut operative on the screw for moving the screw into engagement with the material, a stop member movable with the nut as it is turned to project the screw toward the material, a fixed member having a series of recesses, and means selectively positionable in the said recesses for engaging the stop member to limit movement of the screw.

3. In a device for measuring the thickness of a material and including a support, a screw, and a nut operative against the support and on the screw for projecting the screw toward the material, a stop member affixed to and movable with the nut in a circular path about the axis of the screw, a collar member positioned between the support and the nut and secured to said support, said collar member having a series of spaced recesses, and a pin positionable in any selected recess and in the path of the stop member to engage that member and limit the movement of the nut.

4. In a device for measuring the thickness of a material and including a support, a screw, and a nut operative against the support and on the screw for projecting the screw toward the material, a stop member affixed to and movable with the nut in a circular path about the axis of the screw, a collar member positioned around the screw adjacent to the nut and non-rotatably supported by said support, said collar member having a series of spaced recesses, and a pin positionable in any selected recess and in the path of the stop member to engage that member and limit the movement of the nut.

5. In a device for measuring the thickness of material and including a screw and a nut operative on the screw to project the screw into engagement with the material, a stop member movable with the nut as it is turned to move the screw, a collar member non-rotatably supported around the screw, said collar member having rows of spaced recesses, a pin positionable in any selected recess, and the stop member being adapted to traverse the rows of recesses to engage the pin when placed in a recess in any row and to thereby limit rotation of the nut.

TORJUS GROFF.

REFERENCES CITED

The following references are of record in the file of this patent:

UNITED STATES PATENTS

| Number | Name | Date |
|---|---|---|
| 1,184,837 | Edgecomb | May 30, 1916 |
| 1,192,670 | Moore et al. | July 25, 1916 |
| 1,268,756 | Slocomb | June 18, 1918 |
| 1,381,288 | Davis | June 14, 1921 |
| 1,457,214 | Davis | May 29, 1923 |
| 2,053,472 | Gogan | Sept. 8, 1936 |
| 2,122,203 | Gogan | June 28, 1938 |
| 2,333,747 | Sklar | Nov. 9, 1943 |
| 2,338,001 | La Vigne | Dec. 28, 1943 |
| 2,344,133 | Davis | Mar. 14, 1944 |

FOREIGN PATENTS

| Number | Country | Date |
|---|---|---|
| 10,127 | Great Britain | May 9, 1908 |
| 10,127 | Great Britain | May 10, 1909 |
| 139,357 | Great Britain | Mar. 4, 1920 |